United States Patent [19]
Stephenson et al.

[11] Patent Number: 4,776,606
[45] Date of Patent: Oct. 11, 1988

[54] HITCH AND DRIVE STRUCTURE FOR PTO-DRIVEN, SEMI-INTEGRAL IMPLEMENT

[75] Inventors: Roger D. Stephenson, Bloomfield; James C. Walters; Craig A. Richardson, both of Ottumwa, all of Iowa

[73] Assignee: Deere & Company, Moline, Ill.

[21] Appl. No.: 123,624

[22] Filed: Nov. 20, 1987

[51] Int. Cl.⁴ .......................................... A01B 59/043
[52] U.S. Cl. ............................. 280/415 A; 172/248; 172/439; 280/456 A; 280/461 A
[58] Field of Search .......... 280/446 A, 456 A, 456 R, 280/460 A, 460 R, 504, 415 A, 415 R, 461 R, 479 A, 490 A, 490 R; 180/53.3; 56/14.9, 15.9, 228; 172/248, 272, 439

[56] References Cited

U.S. PATENT DOCUMENTS

| | | | |
|---|---|---|---|
| 3,048,228 | 8/1962 | Hess | 172/439 |
| 3,093,394 | 6/1963 | McCollum | 172/439 |
| 3,151,883 | 10/1964 | Stuart | 172/272 |
| 3,312,478 | 4/1967 | Knappi | 172/248 |
| 3,450,220 | 6/1969 | Frandsen | 172/248 |
| 3,472,528 | 10/1969 | Richey | 280/461 A |
| 4,431,207 | 2/1984 | Langenfeld | 280/479 A |
| 4,738,461 | 4/1988 | Stephenson | 280/400 |

FOREIGN PATENT DOCUMENTS 1426050 2/1976 United Kingdom ........... 280/415 A

Primary Examiner—David M. Mitchell
Assistant Examiner—Everett G. Diederiks, Jr.

[57] ABSTRACT

A hitch adapter is attached to the tongue of an implement having components adapted for being driven by a tractor power take-off shaft and is constructed to permit the implement to be semi-integrally mounted either to a tractor having a hitch arrangement consisting only of a three-point hitch or to a tractor having a hitch arrangement wherein a quick coupler is carried by its three-point hitch without necessitating a change in the length of a drive shaft interconnecting the tractor power take-off shaft with an input shaft of a transmission assembly carried by the implement tongue.

7 Claims, 2 Drawing Sheets

HITCH AND DRIVE STRUCTURE FOR PTO-DRIVEN, SEMI-INTEGRAL IMPLEMENT

BACKGROUND OF THE INVENTION

The present invention relates to agricultural implements and more particularly relates to a hitch adapter connectable either directly to tractor three-point hitch links or to a quick coupler or hitch carried by the tractor three-point hitch links.

When hitching three-point mounted or semi-integral, driven implements to tractors, variations in the distance from the tractor to the three-points of connection can occur. Much of this variation is the result of using a quick coupler or hitch on the tractor three-point hitch. As a result of this variation, it is often necessary to use different length power shafts to go from tractors with quick couplers (or long three-point hitch links) to tractors without quick couplers.

To cope with this problem some manufacturers of PTO-driven implements recommend that the user cut the drive or power shaft to fit a particular standard sized tractor hitch arrangement. However, once the drive shaft has been cut, it cannot be used to connect the implement to a tractor having a different standard sized hitch arrangement.

SUMMARY OF THE INVENTION

According to the present invention there is provided a novel hitch adapter.

An object of the invention is to provide a hitch adapter which permits a PTO driven implement to be coupled directly to the links of a tractor three-point hitch or to a quick coupler carried by the links without requiring drive shafts of different lengths.

A more specific object is to provide a hitch adapter having lower sets of holes, of which appropriate ones may be respectively selected for attachment directly to lower three-point hitch links or to a quick coupler, and having a U-shaped channel member pivoted at its upper end for movement between a forwardly extending position, for disposing a set of mounting holes for attachment directly to the three-point hitch upper link, and a rearwardly extending, out of the way position for permitting attachment of the hitch adapter to the quick coupler.

DESCRIPTION OF THE PREFERRED EMBODIMENT

Figure 1:
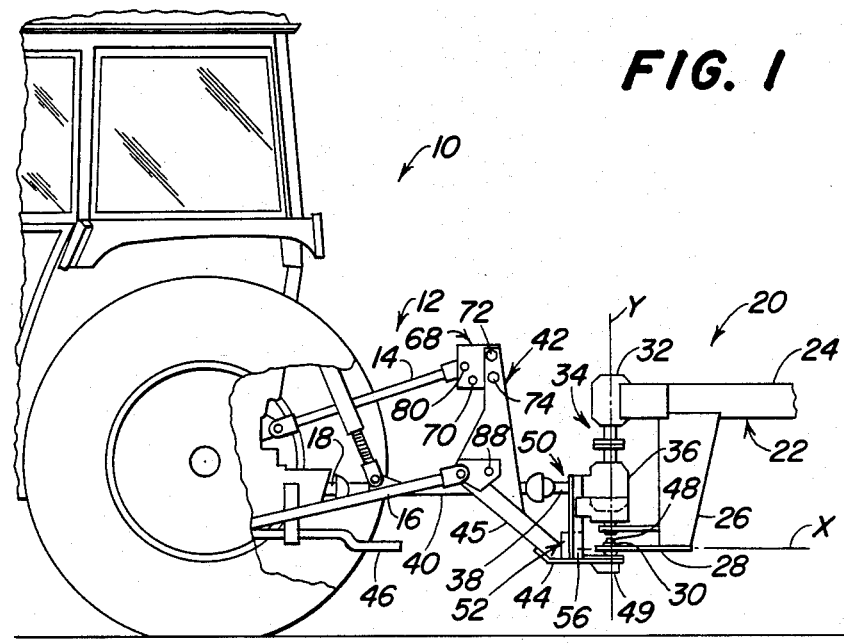
FIG. 1 is a left side elevational view showing a three-point hitch connected directly to a hitch adapter, which embodies the present invention and to which a PTO-driven implement is coupled.

Referring now to the drawings, there is shown a rear portion of a tractor 10 equipped with a three-point hitch 12, including a central upper link 14 and a pair of laterally spaced lower links 16, and with a power take-off shaft 18. Also shown is a forward end portion of an agricultural implement 20 semi-integrally mounted to the tractor and including components (not shown) adapted for being driven by the tractor PTO shaft 18. Specifically, the implement 20 includes a forwardly extending tongue 22 defined by a box beam 24 having a hitch member 26 depending therefrom and including, at its bottom end, a forwardly extending hitch structure 28 carrying a ball connector 30. An upper gearbox or housing 32 of a transmission assembly 34 is fixed to the forward end of the box beam 24 and supports a lower gearbox or housing 36 for rotation about an upright axis Y which passes through the ball connector 30 and is vertical when the implement tongue 22 is held in an elevated, normal working position by the three-point hitch 12. An input shaft 38 of the transmission assembly 34 is supported in the lower gearbox 36 and is coupled to the tractor power take-off shaft 18 by a telescopic drive or power shaft 40 having universal joints at its opposite ends for permitting relative movement between the tractor 10 and implement 20. A hitch adapter 42 includes a fore-and-aft extending drawbar 44 secured to a central portion of a bowed, downwardly and rearwardly extending cross member 45 and being located approximately at the same level as a tractor drawbar 46 when the tongue 22 is in its normal working position and including an upright stud 48 received in the ball connector A storage stand 49 in the form of a bent plate is fixed to the bottom of the drawbar 44 and serves as a down stop, for preventing the three-point hitch 12 from being lowered to the extent that the U-joints embodied in the drive shaft 40 operate at undesirable angles, and serves to support the implement on the ground when the tractor hitch arrangement is disconnected from the hitch adapter 42. Fixed to the top of the drawbar 44 and to the rear of the cross member 45 and forming part of a steering assembly 50 is a guide member 52 having a cylindrical guide surface 54 arranged concentrically about an axis X passing through the ball connector 30 and intersecting the axis Y. The steering assembly 50 further includes a pair of steering arms 56 formed of angle members and fixed to opposite sides of the lower gearbox 36 so as to depend therefrom in vertical relationship to the axis X and with opposite inner faces thereof engaged with diametrically opposite surface portions of the cylindrical guide surface 54. Thus, it will be appreciated that the steering assembly 50 acts in response to turning movement of the hitch adapter 42 about the axis Y to correspondingly turn the lower gearbox 36 to maintain a desired parallel relationship between the input shaft 38 and PTO shaft 18 but does not act to effect any movement of the gearbox 36 when the tractor 10 rolls about the ball connector 30 relative to the implement 20.

Figure 2:
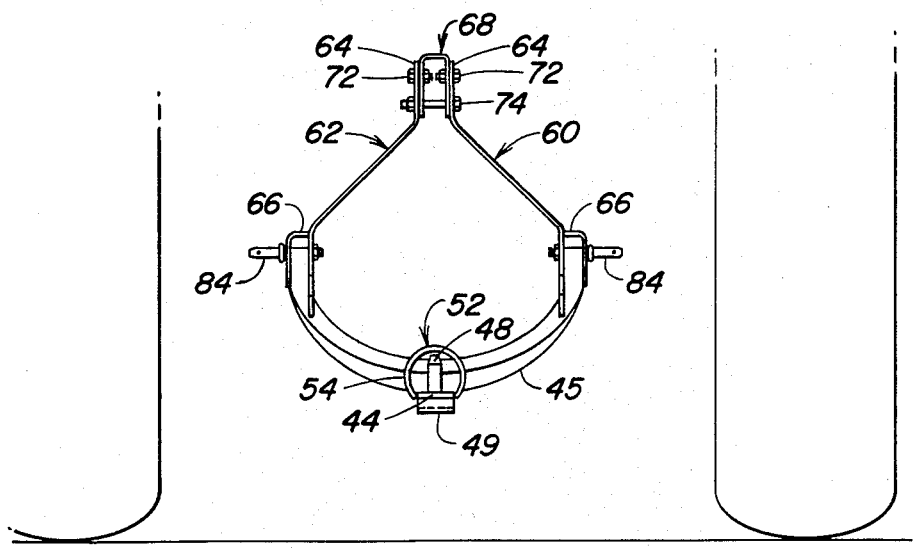
FIG. 2 is a rear view of the hitch adapter shown in FIG. 1.
Figure 3:
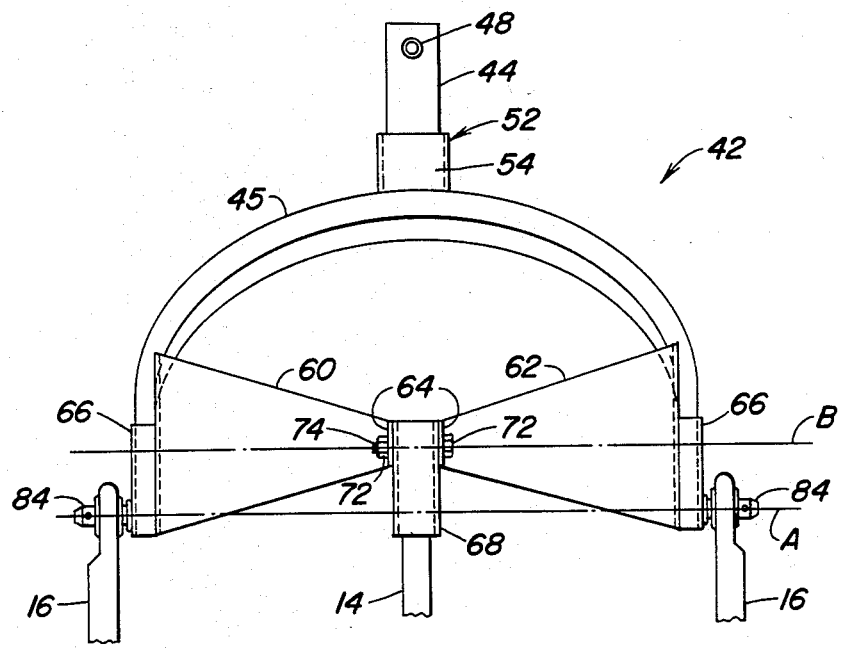
FIG. 3 is a top view of the hitch adapter shown in FIG. 1.
Figure 4:
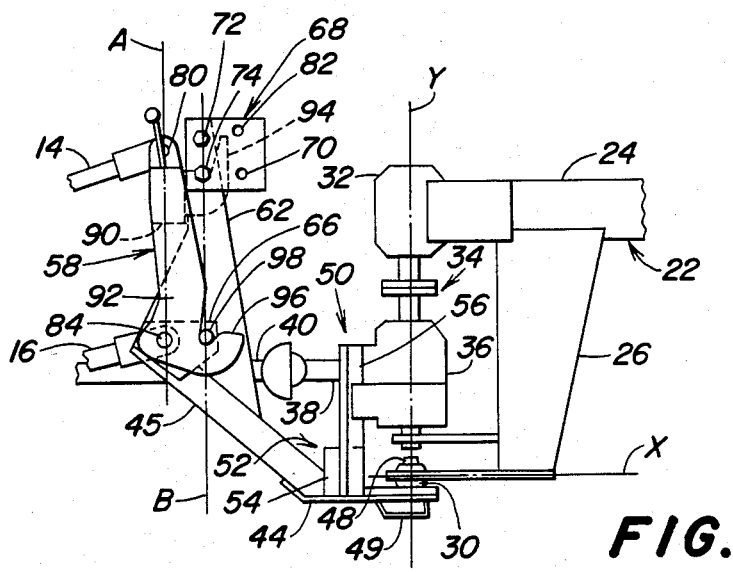
FIG. 4 is a view like FIG. 1 but showing the hitch adapter channel member rotated to a rearwardly extending out-of-the-way position and the hitch adapter coupled to a quick coupler carried by the tractor three-point hitch.

The hitch adapter 42 is specially constructed so that the implement 20 may be coupled to tractors equipped with hitch arrangements including three-point hitch links of various lengths used either alone, as shown in FIGS. 1-3, or together with a quick coupler 58, as shown in FIG. 4, without requiring different lengths of drive shafts 40 to be used with different hitch arrangements.

Referring first to the hitch arrangement shown in FIGS. 1-3, the hitch adapter 42 includes an upright mast structure defined by right and left legs 60 and 62 having central, downwardly diverging portions extending between and joined to parallel, spaced upper end portions 64 and parallel, spaced lower end portions 66, each defining a downwardly opening channel. The upper end of the hitch adapter 42 is defined by a forwardly projecting, inverted, U-shaped channel member 68 which is substantially square in side view and includes a set of three mounting holes 70 arranged at consecutive corners of the member, 68 such that lines connecting the holes form a right, isosceles triangle. The channel member 68 is received between the leg upper end portions 64 and are fixed thereto by upper and lower fastener means 72 and 74 respectively received in the rearmost pair of the sets of holes 70 and in alternate upper sets of quick hitch mounting holes provided in the leg upper end portions in axial alignment with the rearmost pair of the sets of holes 70. The upper three-point hitch link 14 has its rear end received between forward portions of opposite sides of the channel member 68 and contains a hole which receives a pin 80 located in a set of upper link mounting holes 82 provided in the channel member. The lower pair of links 16 have their respective rear ends located beside the channels defined by the leg lower end portions 66 and each contains a hole which receives a pin 84 located in a set of lower link mounting holes located in the portions 66 in a forward, vertical transverse plane A extending through the set of upper link mounting holes 82. A lower set of quick hitch mounting holes 88 is located in each of the leg lower portions 66 behind the lower link mounting holes in a rear, vertical transverse plane B extending through the alternate upper sets of quick hitch mounting holes 70 containing the fastener means 72 and 74.

Referring now to the hitch arrangement shown in FIG. 4, it can be seen that the hitch adapter 42 is coupled to the quick coupler 58. The quick coupler 58 is shown somewhat schematically but is of a construction similar to that disclosed in U.S. Pat. No. 4,415,175, for example. Thus, the quick coupler 58 includes an inverted, U-shaped framework defined by an upper cross member 90 having legs 92 joined to opposite ends thereof. Located centrally between opposite ends of the cross member 90 and extending rearwardly therefrom is an upwardly opening, upper hook 94. Each of the legs 92 has a lower end defined by a rearwardly extending, upwardly opening hook 96. The hooks 94 and 96 have respective pin receptacles located in the rear vertical transverse plane B. Provided in the U-shaped framework and in the forward vertical transverse plane A at respective locations ahead of the upper hook 94 and pair of lower hooks 96 is a set of upper link mounting holes, receiving the pin 80 and connecting the upper link 14 to the quick coupler, and a pair of lower link mounting holes, receiving the pins 84 and connecting the lower links 16 to the quick coupler.

The quick coupler 58 shown in FIG. 4 is a standard size, such as a category II quick coupler, for example, and the upper hook 94 thereof extends between the adapter legs 60 and 62 and is engaged with the lower fastener means 74, which in this case would be a pin. However, if a quick coupler of a different standard size, such as a category III N quick coupler was used, for example, the upper hook of the quick coupler would be engaged with the upper fastener means 72, which in this case would be in the form of a pin while the lower fastener means 74 would be in the form of a pair of bolt assemblies that are spaced to permit the upper hook to move therebetween toward and away from engagement with the upper fastener means 72. The lower hooks 96 of the quick coupler are in latched engagement with pins 98 received in the quick hitch mounting holes 88.

The hitch adapter 42 can be converted from its configuration (FIG. 1) for attachment directly to three-point hitch links to a configuraton (FIG. 4) for attachment to a quick coupler by removing the upper fastener means 72, loosening the lower fastener means 74, if necessary, and pivoting the channel member 68 ninety degrees clockwise or rearwardly to an out of the way position wherein the unused hole 70 in FIG. 1 is matched with the upper set of holes contained in the leg upper end portions 68. The upper fastener means 72 is then replaced. Complete removal of the channel member 68 i an alternative to the above conversion procedure; however, such removal might result in the channel member 68 becoming misplaced or otherwise not readily available for use should it be desired to reconnect the hitch adapter for direct connection to three-point hitch links.

Additionally, it is to be noted that the mounting holes provided in the hitch adapter 42 in the rearward vertical plane B may be used to mount the hitch adapter to a three-point hitch having longer links than the links 14 and 16 without varying the spacing between the tractor power take-off shaft 18 and the implement transmission input shaft 38. Thus, it will be appreciated that the hitch adapter 42 may be used with various combinations of tractor hitch arrangements without necessitating any change in the length of the drive shaft or drive line 40.

We claim:

1. A hitch adapter comprising a mast structure which, as viewed in an upright operative position, is defined by a pair of legs having parallel upper end portions, divergent central portions, and lower end portions parallel to said upper end portions, said upper end portions containing upper and lower sets of mounting holes, said lower end portions containing aligned forward and rearward mounting holes, a U-shaped channel member having a pair of arms integrally connected by a cross member, said pair of arms having first, second, third and fourth sets of aligned mounting holes, means for connecting said channel member to said parallel upper end portions of said mast structure in first and second positions so as to enable said hitch adapter to optionally be respectively connected either directly to standard tractor three-point hitch links or to a standard quick coupler carried by the three-point hitch links, in said first position, said first and second sets of aligned mounting holes are respectively aligned with said upper and lower sets of mounting holes and upper and lower fasteber means extend through these aligned holes to secure the U-shaped channel member to said mast structure with said first and second sets of aligned mounting holes and said aligned rearward mounting holes being located in a transverse upright plane, further means are provided to connect the upper three-point hitch link to said U-shaped channel member and the lower three-point hitch links to either of said aligned forward or rearward mounting holes, in said second position, said second and third sets of aligned mounting holes are respectively aligned with said lower and upper sets of mounting holes and the fastener means extend through these aligned holes to secure the U-shaped channel member to said mast structure with said second and third sets of aligned mounting holes and said aligned rearward mounting holes being located in a transverse upright plane, further means are provided to connect the quick coupler to the hitch adapter utilizing said aligned rearward mounting holes and either of said second and third sets of aligned mounting holes.

2. The hitch adapter defined in claim 1 wherein the channel member projects forwardly from the leg upper end portions when in its first position and projects rearwardly from the leg upper end portions when in its second position.

3. The hitch adapter defined in claim 2 wherein the channel member is substantially square in side view with one side of the square being located adjacent respective back edges of the leg upper end portions when the channel member is in its first position and with a second side, contiguous to the first side, being located adjacent respective forward edges of the leg upper end portions when the channel member is in its second position.

4. The hitch adapter defined in claim 1 wherein the channel member is located between the upper end portions of the legs.

5. The hitch adapter defined in claim 1 wherein the first, second and third sets of aligned of mounting holes are arranged in a pattern forming a right isosceles triangle.

6. The hitch adapter defined in claim 5 wherein the channel member is substantially square in side view with the first, second and third sets of mounting holes being located adjacent consecutive corners of the channel member.

7. The hitch adapter defined in claim 6 wherein the channel member is located between the upper end portions of the legs and wherein the first, second and third set of mounting holes are arranged such that the channel member can be rotated between its first and second positions by removing the upper fastener means and loosening the lower fastening means.

* * * * *